J. Bowser,
Apple Corer and Cutter,
No. 45,312. Patented Dec. 6, 1864.

Witnesses:
A. Moson
V. Lemard

Inventor:
John Bowser

UNITED STATES PATENT OFFICE.

JOHN BOWSER, OF BASIL, OHIO.

IMPROVED APPLE CORER AND CUTTER.

Specification forming part of Letters Patent No. 45,312, dated December 6, 1864; antedated November 23, 1864.

*To all whom it may concern:*

Be it known that I, JOHN BOWSER, of Basil, in the county of Fairfield and State of Ohio, have invented a new and useful Machine for Coring and Cutting Apples; and I do hereby declare that the following is a full, clear, and exact description of the construction and operation of the same, reference being had to the annexed drawings, making a part of this specification.

Figure 3:
Figure 2:
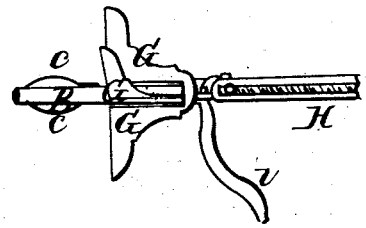
Figure 1:
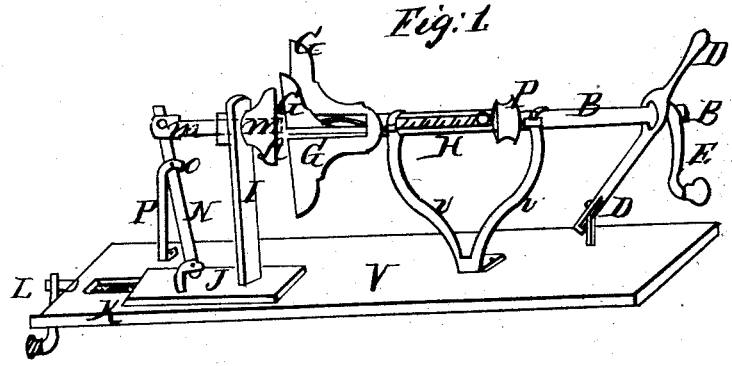

Figure 1 represents the machine, together with coring-knives drawn in; Fig. 2, a section with the coring-knives pushed out as it enters the apple to core; Fig. 3, a section showing edge of knives, and also tube B.

The apple is held against the disk A with the left-hand tube, B, with the knives $c$ $c$ being forced through the apple by means of lever D. Crank $e$, being turned once round while the apple is still held firm in the left hand, cuts the core. Part of the core comes out of the end of tube B. Then take hold of knob F with the left hand and quarter the apple with the knives $g$ $g$ $g$ $g$. The knives are held to their place by set-screw in tube B, working in slot of tube H, from interfering with knives on tube B, disk A being fastened to upright bar I, working in slide J. By turning screw K by crank L, to set for large and small apples, plug M, fitting in the hole of disk A, and fastened to the slotted bar N, which moves on pivot O on the end of shaft P, also on pivot fastened on slide bar J, will open the hole in disk A by turning crank L, for the end of tube B to pass in for coring large and small apples.

I claim—

The tube B, with the knives fastened thereon, in combination with tube H and knives $g$ $g$ $g$ $g$, the moving and setting of disk A, by means of a screw or otherwise, so that the core is always cut in the center of the apple, as also the motion of plug M to open and close the hole in disk A for tube B to pass in for coring small apples substantially as specified.

JOHN BOWSER.

Witnesses:
 WILLIAM SCHOPP,
 HENRY SCHOPP.